US010395265B2

(12) United States Patent
Vaysman

(10) Patent No.: US 10,395,265 B2
(45) Date of Patent: Aug. 27, 2019

(54) CROWD SOURCING COUPON REDEMPTION INFORMATION

(71) Applicant: Aintu Inc., San Jose, CA (US)

(72) Inventor: Arthur Vaysman, San Jose, CA (US)

(73) Assignee: Aintu Inc., San Jose, CA (US)

( * ) Notice: Subject to any disclaimer, the term of this patent is extended or adjusted under 35 U.S.C. 154(b) by 0 days.

(21) Appl. No.: 14/733,938

(22) Filed: Jun. 8, 2015

(65) Prior Publication Data
US 2015/0356584 A1  Dec. 10, 2015

Related U.S. Application Data

(60) Provisional application No. 62/009,137, filed on Jun. 6, 2014.

(51) Int. Cl.
*G06Q 30/02*  (2012.01)

(52) U.S. Cl.
CPC ............... *G06Q 30/0207* (2013.01)

(58) Field of Classification Search
CPC .... G06Q 30/00; G06Q 30/02; G06Q 30/0207; G06Q 30/0211
USPC ......... 705/14.13, 14.36, 14.35, 14.39, 14.44, 705/14.47, 14.15
See application file for complete search history.

(56) References Cited

U.S. PATENT DOCUMENTS

| | | | |
|---|---|---|---|
| 8,533,045 B1* | 9/2013 | Cunningham | G06Q 30/02 705/14.47 |
| 2002/0046082 A1* | 4/2002 | White | G06Q 20/20 705/14.15 |
| 2008/0270231 A1* | 10/2008 | Li | G06Q 30/0211 705/14.13 |
| 2009/0106085 A1* | 4/2009 | Raimbeault | G06Q 20/208 705/14.44 |
| 2010/0312630 A1* | 12/2010 | Krutchik | G06Q 30/02 705/14.35 |
| 2013/0073372 A1* | 3/2013 | Novick | G06Q 30/02 705/14.36 |
| 2013/0332258 A1* | 12/2013 | Shiffert | G06Q 30/0239 705/14.39 |

* cited by examiner

*Primary Examiner* — Marilyn G Macasiano
(74) *Attorney, Agent, or Firm* — HM Law Group LLP; Vani Moodley, Esq.

(57) ABSTRACT

A method for updating consumers is provided. The method comprises tracking coupon redemption activity across a plurality of store locations; maintaining a coupon redemption store list comprising stores that are currently able to redeem coupon based on the coupon redemption activity; and updating a plurality of client devices with at least a subset of information from the coupon redemption store list to enable shoppers to know the stores at which coupons are redeemable.

13 Claims, 21 Drawing Sheets

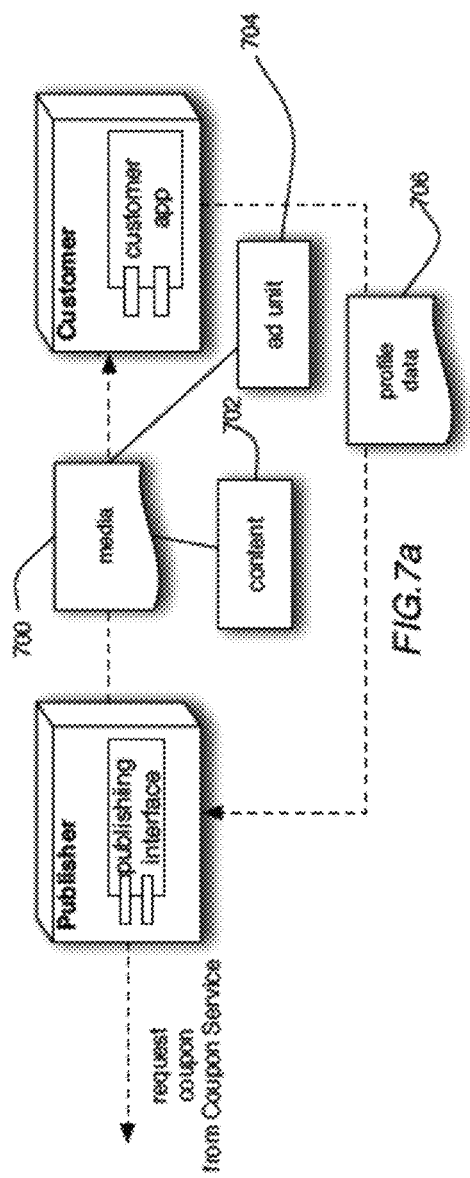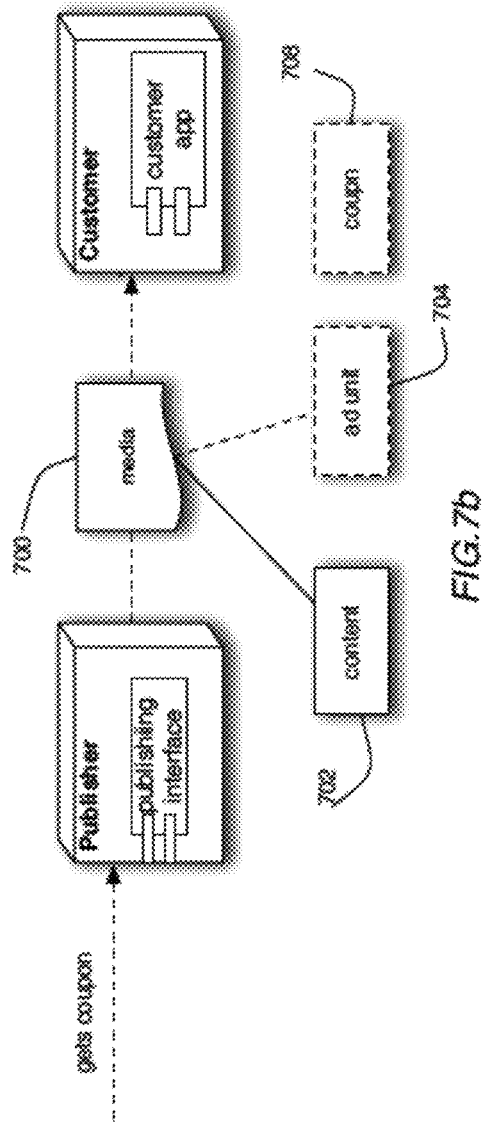
FIG. 7a
FIG. 7b

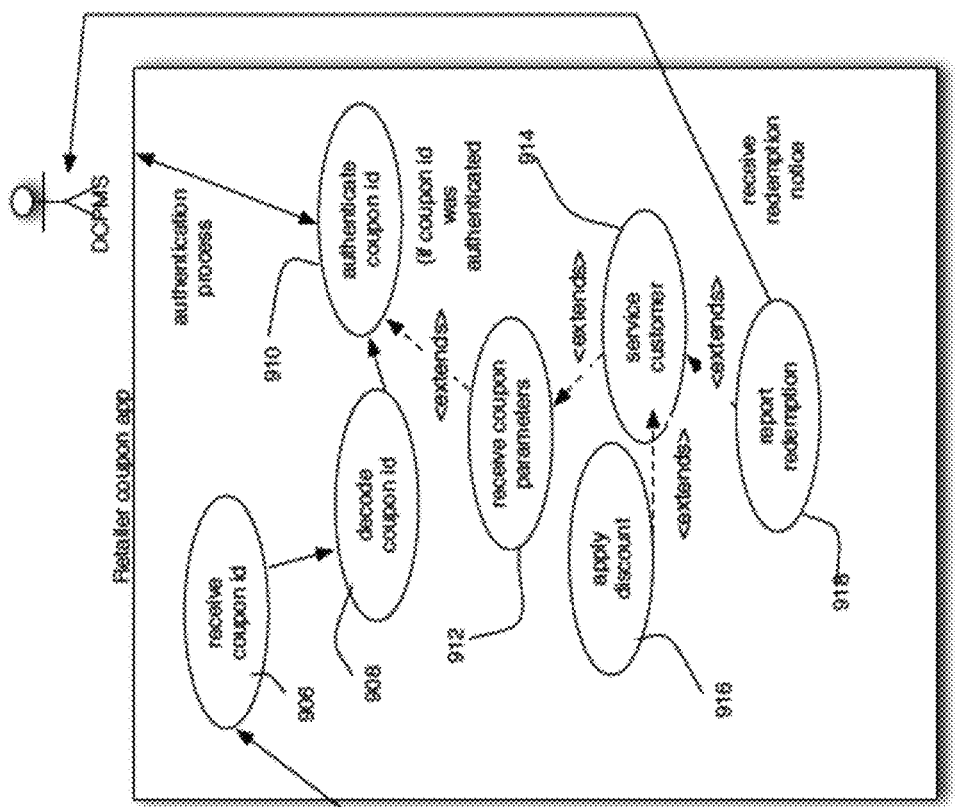
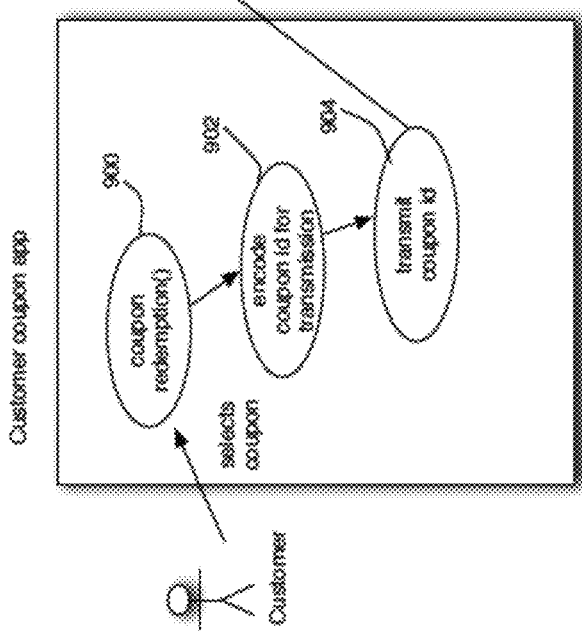
FIG.9B
FIG.9A

| Store ID | Date | Item | Quantity | Coupon ID |
|---|---|---|---|---|
| | | | | |

Coupon redemption notification

| Coupon ID | Date | Store ID | Item |
|---|---|---|---|
| | | | |

Coupon non-redemption notification

CROWD SOURCING COUPON REDEMPTION INFORMATION

This application claims that the benefit of priority to prior U.S. provisional patent application No. 62/009,137 entitled "CROWD SOURCING COUPON REDEMPTION INFORMATION", filed Jun. 6, 2014.

FIELD

Embodiments of the present invention relate to coupons or promotional offers.

BACKGROUND OF THE INVENTION

Coupons are an extremely popular way for advertisers and vendors to promote their particular products and services. Vendors/manufacturers distribute printed coupons to consumers for discounts on particular items for purchase. The consumers clip the coupons and redeem them when purchasing the items to which the coupons relate at a store location. Typically, the stores are brick and mortar stores.

However, not all stores may have inventory of an item a consumer may which to purchase at a discount through the redemption of a coupon. Moreover, even if a store were to have inventory of said item, the store may not be participating in a coupon redemption program. Thus, it is possible that a consumer may travel physically to a store location in order to redeem a coupon there only to discover that it is not possible to redeem said coupon at that store location.

SUMMARY

Broadly, embodiments of the present invention disclose a crowd sourcing technique to identify store locations at which a coupon may be redeemed.

In accordance with one deployment scenario, a consumer downloads and installs a coupon application (app) on a client device, typically a smart phone. Said coupon app may be communicatively coupled to a coupon generation system which has access to consumer profile information whereby said a coupon generation system may provide personalized coupons to the customer based on profile information for the customer.

In one embodiment, the client coupon app is configured so that each time the consumer uses the client coupon app to redeem a coupon at a store location, information is transmitted to a coupon generation system indicative of the store, its location, and what goods were purchased or attempted to be purchased using coupons.

Advantageously, if multiple users use the client coupon app to redeem coupons at multiple locations, over a period of time the coupon generation system will build up a detailed and accurate map of store locations that do redeem coupons, and the details of the particular coupons that may be redeemed at those locations.

Advantageously, the map of coupon locations that support coupon redemptions and details of the products associated with said coupons may be shared with all the client coupon applications in current deployment.

BRIEF DESCRIPTION OF THE FIGURES

FIGS. 7a-b shows a Publisher publishing media on a Customer node, in accordance with one embodiment of the invention.

FIG. 9A shows the use cases for coupon redemption by the customer coupon app, in accordance with one embodiment of the invention.

FIG. 9B shows the use cases for coupon redemption by the retailer coupon app, in accordance with one embodiment of the invention.

FIG. 14 shows the format for a coupon redemption notification, in accordance with one embodiment of the invention.

FIG. 15 shows the format for a coupon non-redemption notification, in accordance with one embodiment of the invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention.

The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
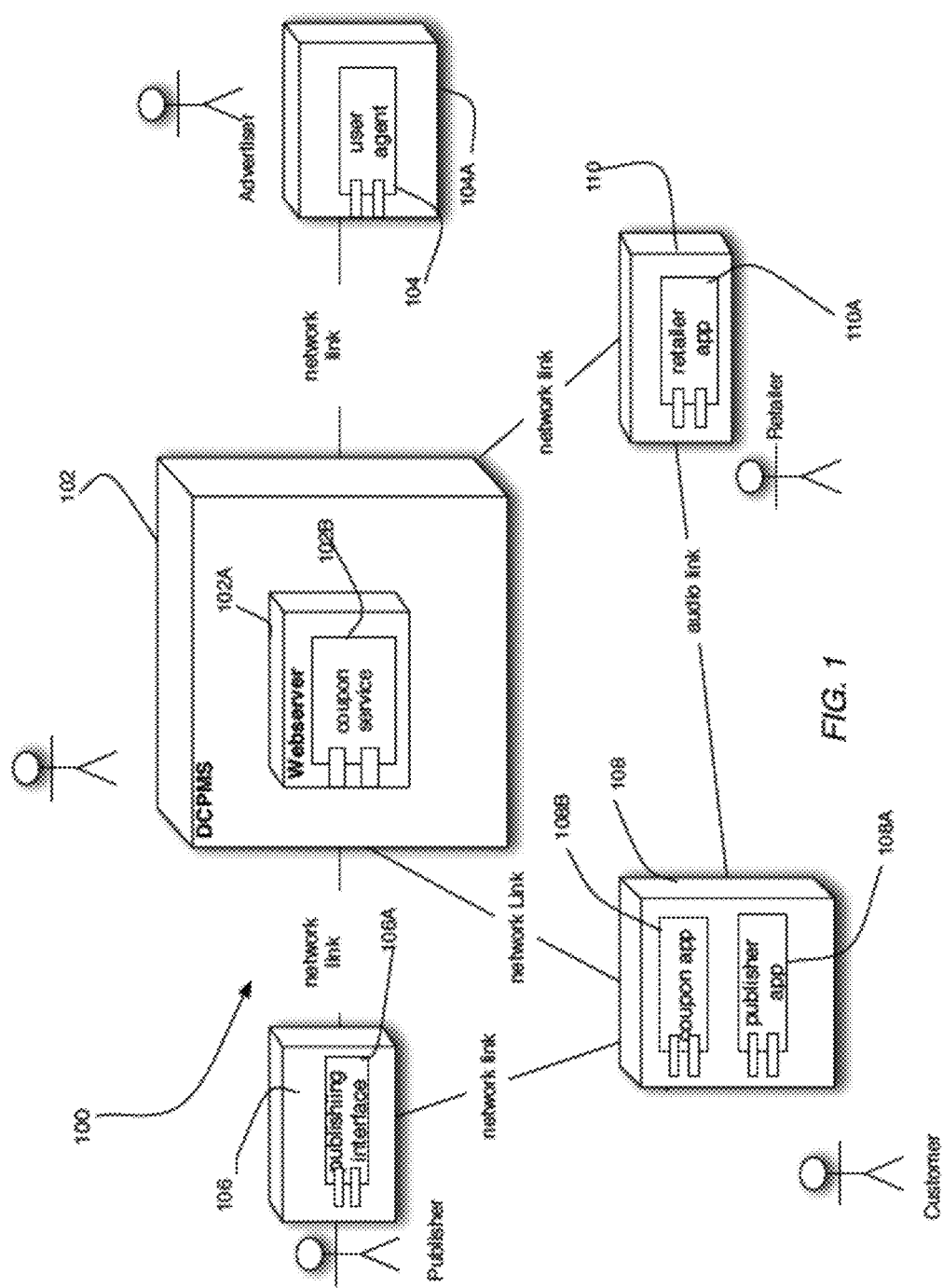
FIG. 1 shows a deployment drawing in accordance with one embodiment of the invention.

FIG. 1 shows a deployment scenario 100 in accordance with one embodiment of the invention. Referring to FIG. 1 a coupon generation system referred to as a Digital Coupon Personalization and Management System (DCPMS) 102 includes a server component 102A which implements a Coupon Service (CS) 102B. The CS 102B is under control of a Coupon Service Provider (CSP). In one embodiment, a plurality of advertiser nodes 104 each equipped with an appropriate user agent (browser) 104A are communicatively coupled to the DCPMS 102 by means of a network link 112. Each advertiser node 104 may include a computing device such as a laptop or PC, and the network link 112 may comprise the Internet. Each advertiser node 104 represent an Advertiser who uses the CS to generate coupons on its behalf, as will be explained.

The DCPMS 102 may also be communicatively coupled with plurality of publisher nodes 106 by means of a network link 112. Each publisher node 106 represents a computing device such as a PC and includes a publishing interface 106A, which represent the mechanism whereby a Publisher is able to publish media on a customer node 108 for viewing by a Customer. Examples of Publishers includes CNN, Facebook, YouTube, etc.

The customer node 108 represents a customer device such as smartphone or tablet PC. In one embodiment, the customer node 108 may include a publisher app 108A and a coupon app 108B. The publisher app 108A may be configured to receive media content from a Publisher, as will be described more fully later. The media content may include a personalized coupon generated by the DCPMS 102.

Finally, the deployment scenario 100 also includes a retailer node 110 which represents retailer.

In one embodiment, the customer node 108 communicates with the retailer node 110 via an audio link 114.

Figure 2:
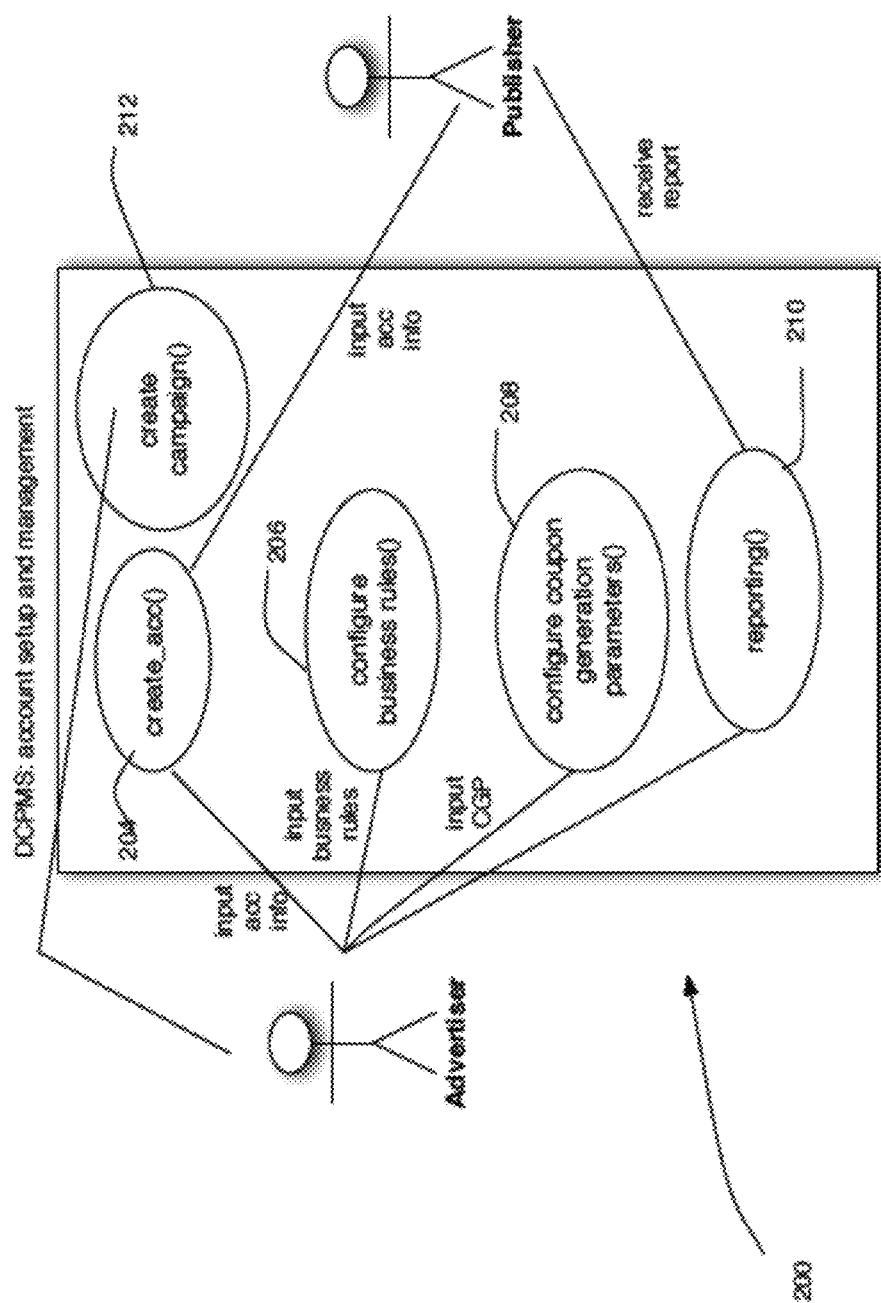
FIG. 2 shows the use cases for the DCPMS, in accordance with one embodiment of the invention.

FIG. 2 shows use cases 200 for the DCPMS 102, in accordance with one embodiment of the invention. As will be seen, the DCPMS 102 supports a create_account ( ) function 202 which allows an Advertiser and a Publisher to create user accounts on the DCPMS 102. A configure_business_rules ( ) function 208 allows an Advertiser to provision business rules and objectives in the DCPMS 102. The business rules and objectives may be used to generate highly personalized coupons for publishing to particular customers, as will be described. The use cases 200 also include a configure_coupon_generation_parameters( ) process 210 whereby an advertiser configures coupon generation parameters which are used to generate personalized coupons. Examples of coupon generation parameters include the following:
 (a) Demographic data;
 (b) Geographic data;
 (c) Offer size for a coupon offer. This may be specified in the terms of a minimum offer size and a maximum offer size;
 (d) The particular medium for which a coupon needs to be generated. Examples of media include video content, banner ads, and printed ads.
 (e) Publisher. Examples of publishers includes Facebook, YouTube, CNN etc.;
 (f) Context for the coupon. Examples of contexts includes sports, politics, science, business, lifestyle, etc.;
 (g) Psycho-graphic information comprising values, opinions, attributes, interests, and lifestyles associated with a target demographic group.

The use cases 200 also include a reporting function 212 whereby reports are generated for Advertisers and Publishers.

Figure 3:
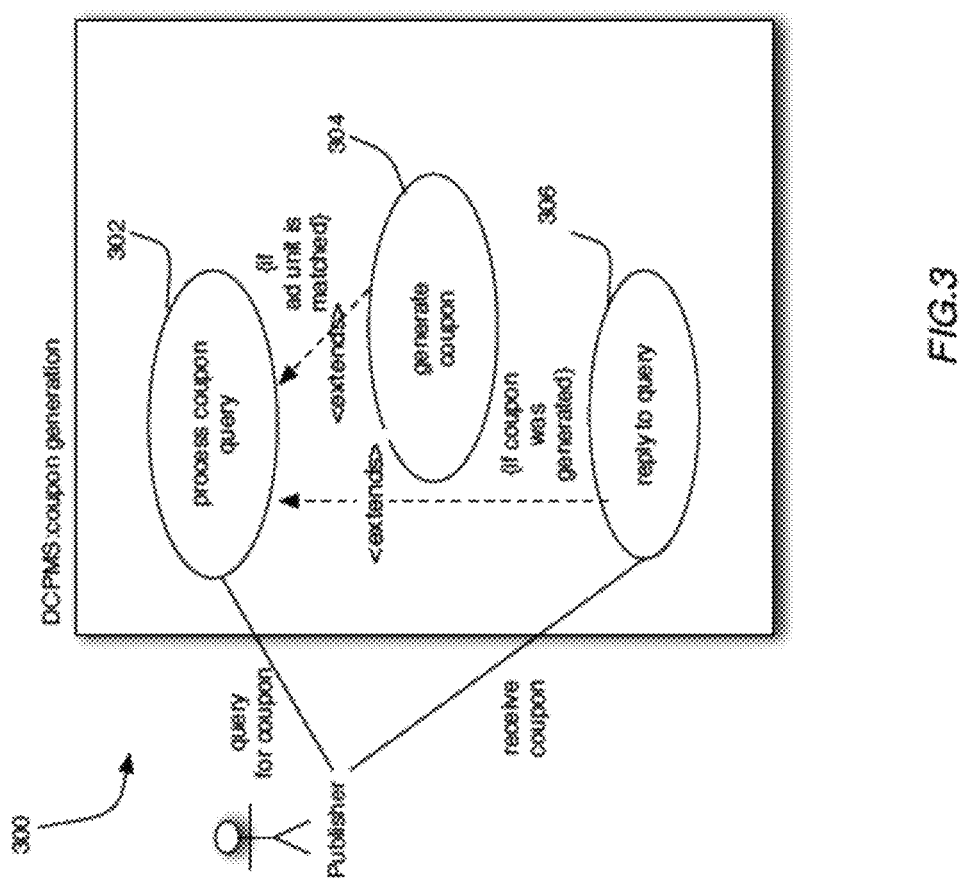
FIG. 3 shows the use cases for coupon generation, in accordance with one embodiment of the invention.
Figure 5:
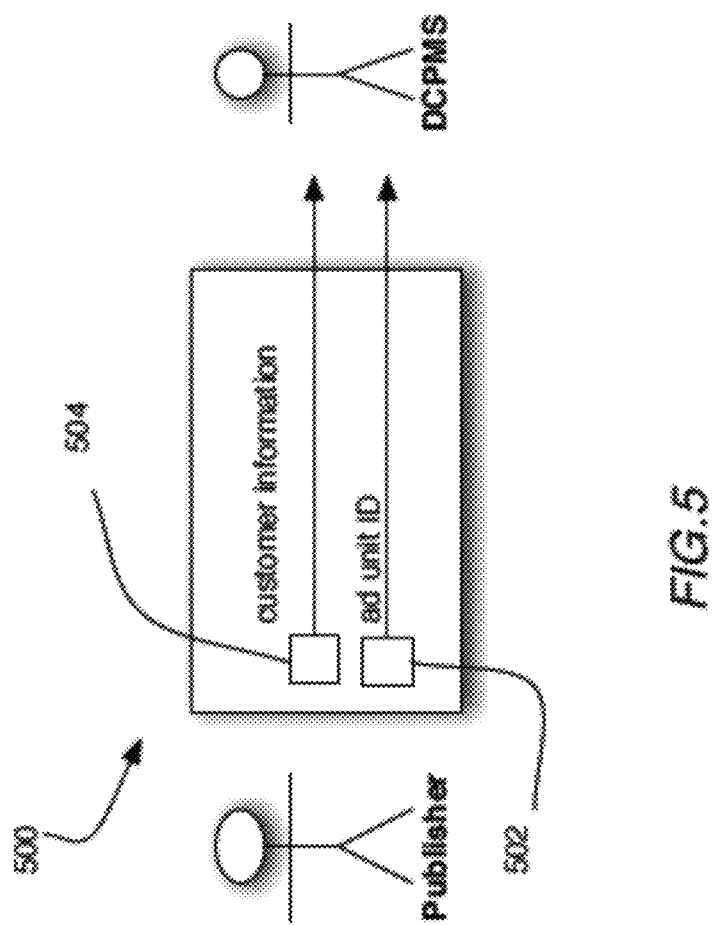
FIG. 5 shows a coupon query Q1, in accordance with one embodiment of the invention.

Referring now to FIG. 3 of the drawings, there is shown use cases 300 for coupon generation, in accordance with one embodiment of the invention. In terms of the use cases 300, a Publisher sends a query Q1 to the DCPMS 102. The query Q1 is a request for a coupon. Generally, at the time of sending the query Q1, the Publisher is already publishing content to a customer and is further typically displaying an advertisement unit (ad unit) in association with the content. This can be seen in FIG. 7a, which shows media 700 being published on a customer node 108, wherein the media 700 includes content 702 and an ad unit 704. FIG. 5 shows the elements of the query Q1, in one embodiment. As will be seen, Q1 includes customer information 500 and an ad unit id 502. The ad unit id 502 corresponds to the ad unit being shown to the Customer. The customer information corresponds to profile information/data 706 (see FIG. 8) about the Customer. The profile data 706 is collected from the Customer node 108 by the Publisher and includes that customer's browsing behavior and information about the customer device itself.

Responsive to receiving the coupon query Q1, the DCPMS 102 executes a process coupon query block 304. Under this block, the DCPMS 102 attempts to match the ad unit id in the coupon query Q1 in an ad unit list. The ad unit list is provisioned by an Advertiser and is basically a listing of ad units for which coupons must be generated by DCPMS 102. Thus, under the process 304, if the ad unit id is matched then a generate coupon function 306 is executed. Under this process, a personalized coupon is generated based on the coupon configuration parameters and based on machine learning techniques.

The use cases 300 also include a reply to query function 308 wherein the DCPMS 102 replies to the query Q1 by returning a coupon to the publisher 302 or a reply indicating that no coupon is available for the particular ad unit associated with the coupon request Q1. FIG. 7B shows the media 700 that is published on a customer node 108 as updated by the Publisher to include a coupon 708.

Figure 4:
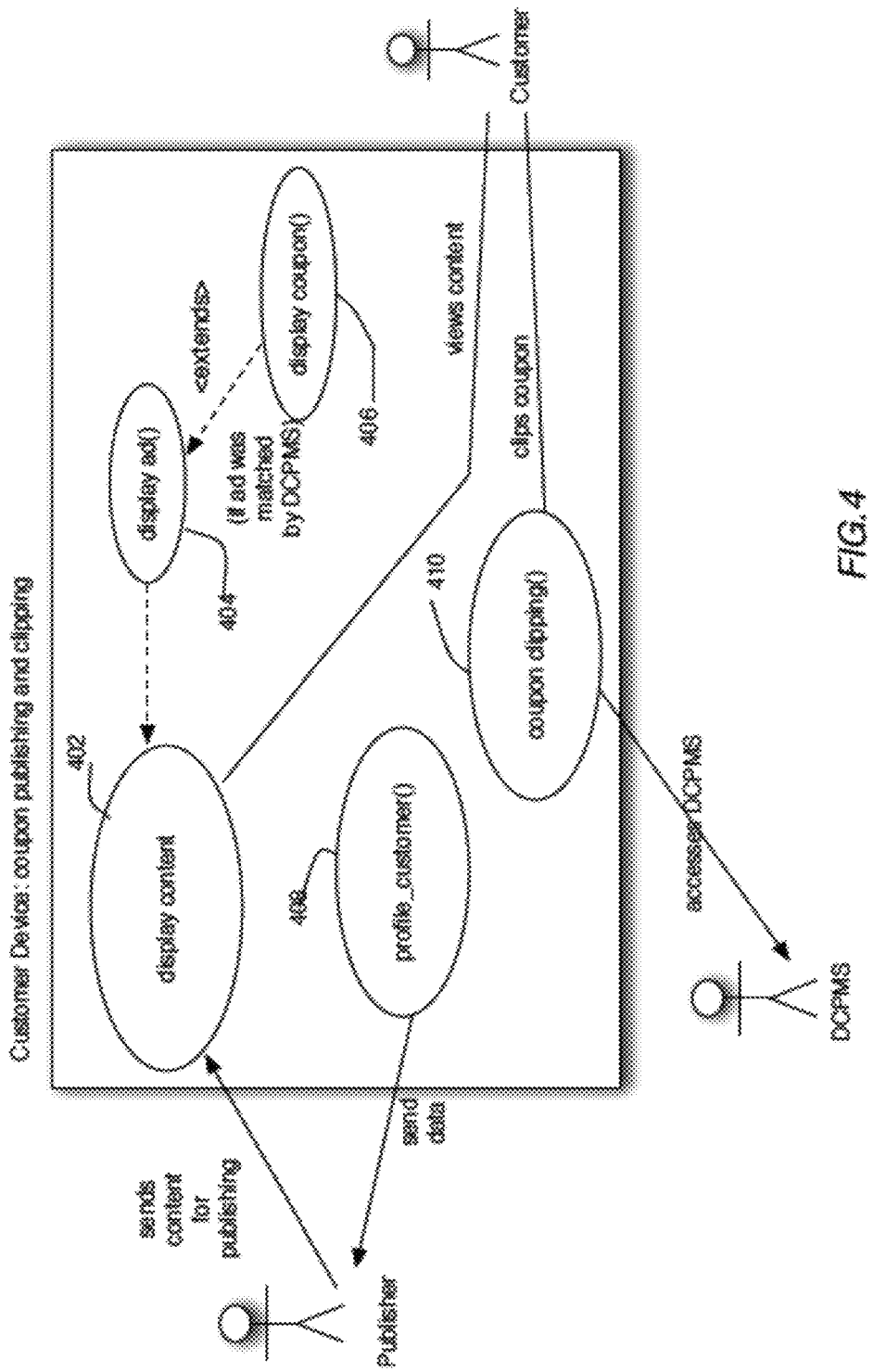
FIG. 4 shows the use cases for coupon clipping and publishing in accordance with one embodiment of the invention.

FIG. 4 shows use cases 400 for coupon displaying and clipping on the customer node 402, in accordance with one embodiment of the invention. As will be seen, the customer node 108 is configured to display content by executing a display content function 402. The display content function 402 may be extended to include a display ad function 404 which in turn may be extended to include a display coupon function 406 if the ad unit associated with the ad being displayed is match by the DCPMS 102, as described earlier. A profile customer ( ) function 408 collects profile information for a customer which is transmitted to the Publisher. The use cases 400 also includes a coupon clipping ( ) function 410. Under the coupon clipping function 410, a Customer performs a 'clipping action' in relation to a coupon. For example, in one embodiment, the clipping action may include selection of a clipping button associated with the coupon. Responsive to said clipping action, the coupon clipping function 410 generates a coupon clipping notification and transmits it to the DCPMS 102.

Figure 8:
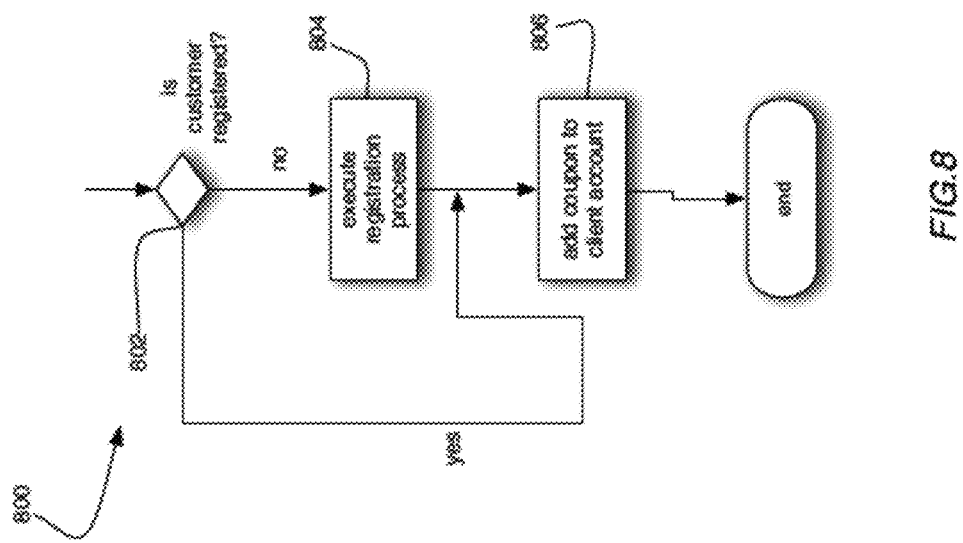
FIG. 8 shows a flowchart for processing a coupon clipping notification, in accordance with one embodiment of the invention.

Referring now to FIG. 8 of the drawings, there is shown a process 800 executed on the DCPMS 102 responsive to receiving a coupon clipping notification. At block 802, a check is made to determine if the customer is a registered customer. In one embodiment this step includes validating customer credentials included in the coupon clipping notification. If it is determined that the customer was not registered, then at block 804, a registration process is executed in order to register the customer. This process may include redirecting a customer to a registration page in order for the customer to input registration information. At block 806, the coupon identified by the coupon id in the coupon clipping notification is added to the customer's account. At this point, the DCPMS 102 may inform the Publisher that the coupon has been clipped, in which case the publisher may instruct a browser being used by the customer node 108 to view the coupon to stop displaying the coupon.

In the case where a Customer is using the coupon app 108B to view the published content, the coupon app 108B includes logic to stop showing the coupon as soon as the coupon clipping action is performed. Thus, a seamless coupon clipping experience is facilitated.

Referring now to FIG. 9A of the drawings, there is shown a use case for coupon redemption by a Customer. As will be seen, a coupon redemption( ) function 900 includes a process 902 for encoding a coupon for transmission, and a process 904 for transmitting said encoded coupon to a retailer node. In one embodiment, the process 902 for encoding the coupon for transmission encodes the coupon as an audio signal which is then transmitted via a speaker associated with the customer node 108. The retailer node 110 then uses a microphone to detect the audio encoding. FIG. 9B also shows a use case for the retailer coupon app 110A to redeem a coupon, in accordance with one embodiment. Referring to FIG. 9B, process 906 comprises a receive coupon id ( ) function whereby a microphone of the retailer node 110 is used to listen for the coupon transmission from the customer node 108. A decode coupon id ( ) process 908 decodes the audio signal in order to extract the coupon id. An authenticate coupon id ( ) process 910 includes transmission of the coupon id to the DCPMS 102 by the retailer coupon app for authentication. The DCPMS 102 authenticates the coupon id and returns coupon parameters associated with the coupon id that was authenticated. The retailer coupon app then executes a receive coupon parameters ( ) function 912 to receive the coupon parameters from the DCPMS 102. A service customer ( ) function 914 includes servicing the customer by providing the goods and/or services associated with the coupon. A apply discount ( ) function 916 extends the service customer ( ) function 914 to apply the discount indicated in the coupon to the transaction with the customer. A report redemption ( ) function 918 includes operations to report any coupon redemption to the DCPMS 102.

Figure 6:
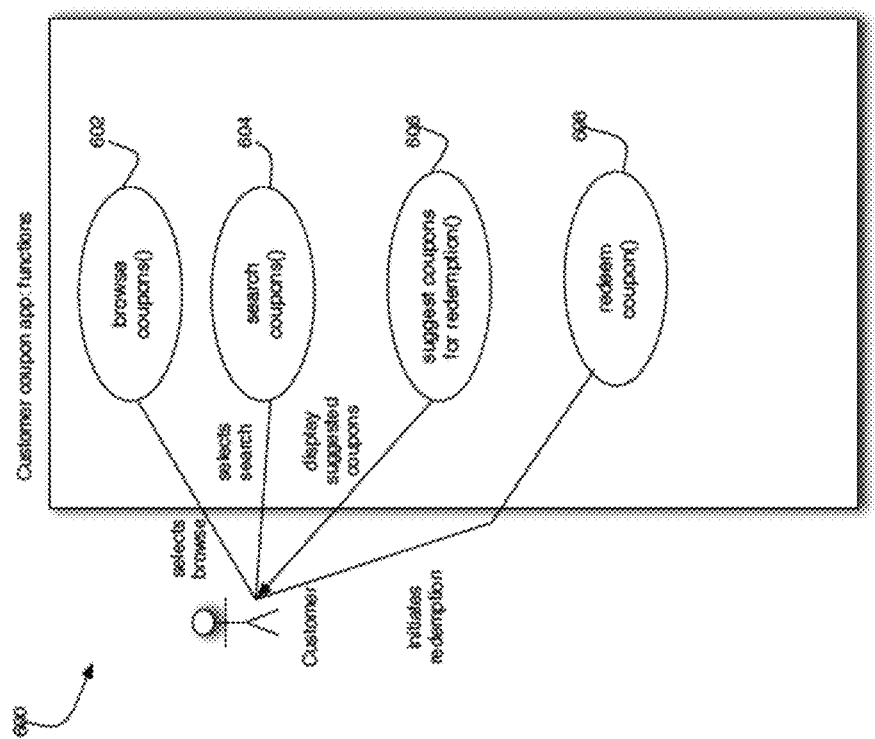
FIG. 6 shows the use cases for the customer coupon app, in accordance with one embodiment of the invention.

Referring now to FIG. 6 of the drawings, use cases 600 are associated with the coupon app 108B. As will be seen, the use cases 600 may include a browse coupons ( ) function 602. This function allows a Customer to browse previously clipped coupons. A search coupon ( ) function 604 allows the Customer to search for particular coupons based on search criteria. A suggest coupon for redemption ( ) function 608 implements functionality to proactively suggest coupons for redemption to a Customer. For example, in one embodiment based on the location, the Customer may be shown coupons that are only available for redemption at that particular location. Finally, the use case 600 includes a redeem coupon function ( ) 610, whereby the Customer may redeem a selected coupon, as has been described above.

Figure 10:
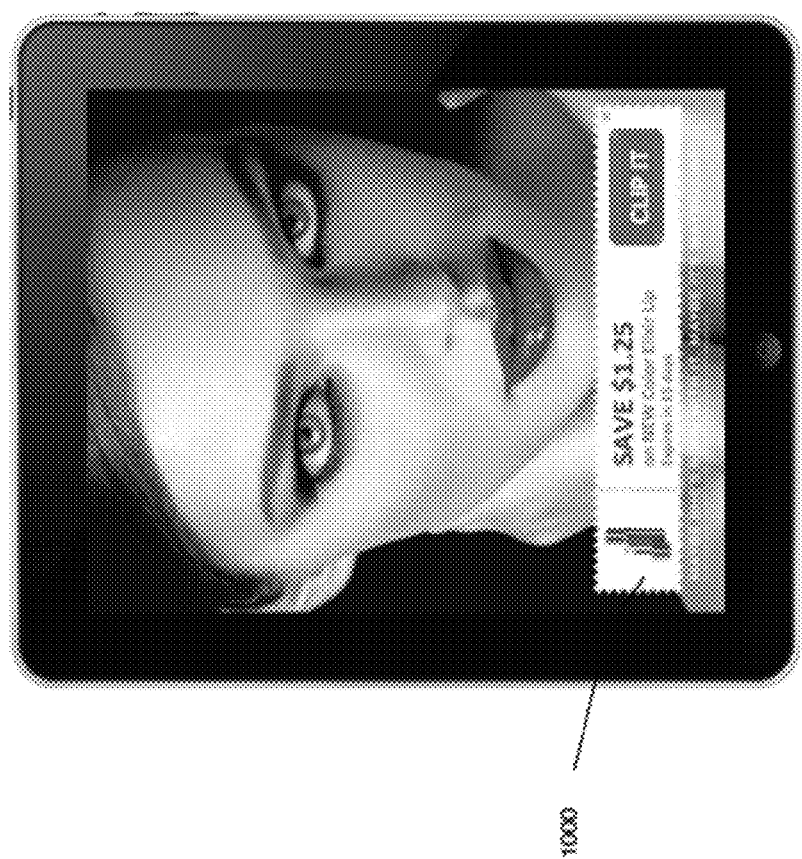
FIG. 10 shows an example of published coupon, in accordance with one embodiment of the invention.
Figure 11:
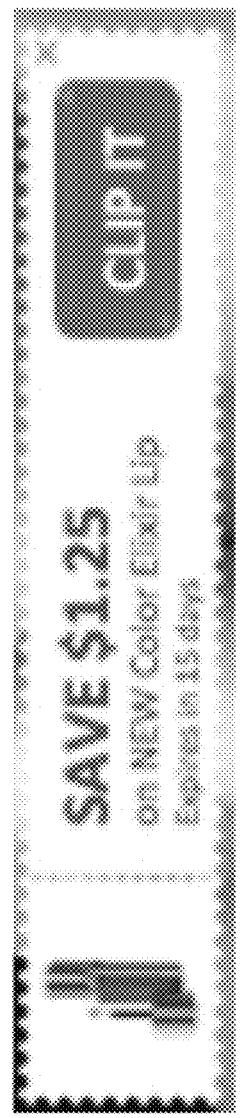
FIG. 11 shows the published coupon of FIG. 10 in magnified view, in accordance with one embodiment of the invention.
Figure 11:
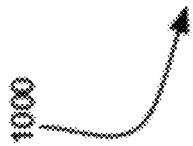

Referring now to FIG. 10 of the drawings, there is shown a coupon 1000 which is published in association with an advertisement for women's' lipstick. The coupon 1000 is shown in magnified view FIG. 11 of the drawings. As will be seen, the coupon 1000 includes a discount of $1.25, and a coupon expiration, which is set to 15 days. Further, the coupon 1000 includes a 'clip it button'. This button may be used to clip the coupon 1000 in accordance with the techniques disclosed herein.

Figure 12:
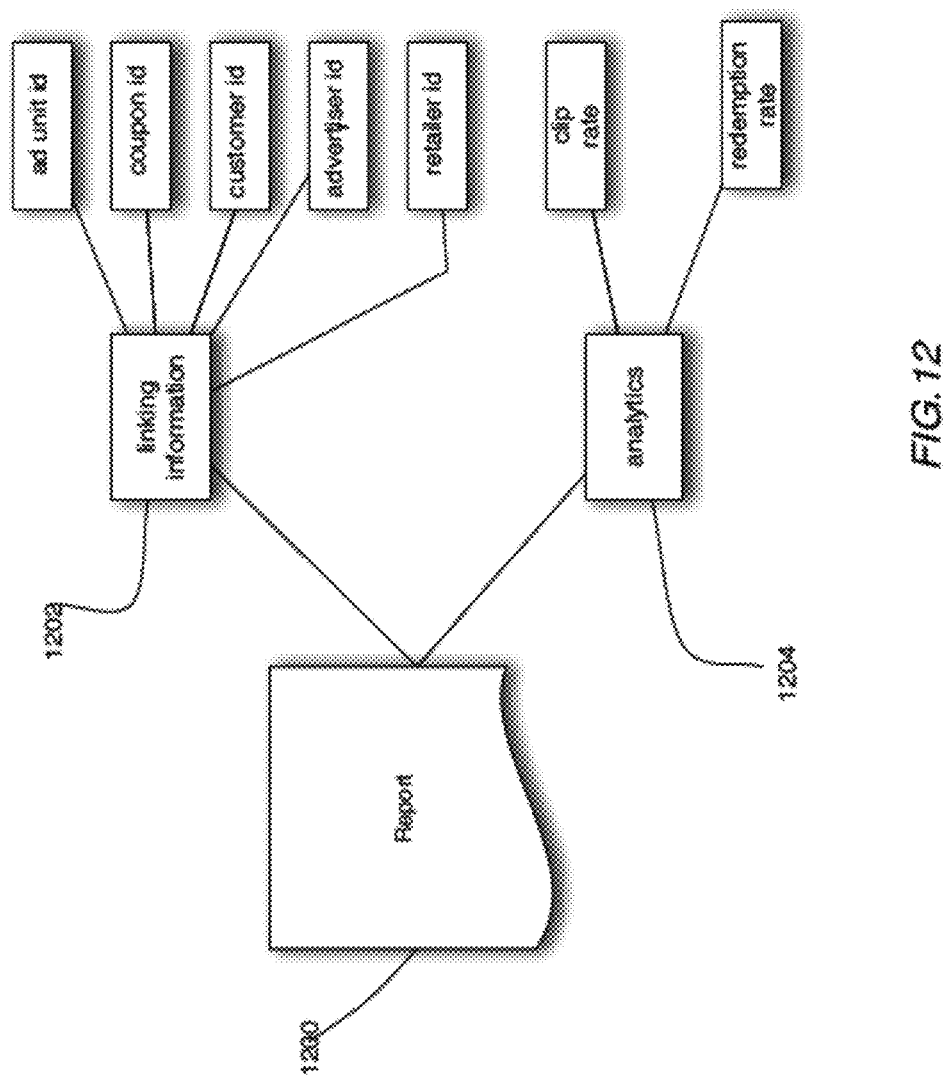
FIG. 12 shows an example of a report to an Advertiser, in accordance with one embodiment of the invention.

FIG. 12 shows a report 1200 that may be generated for an Advertiser, in accordance with one embodiment. The report 1200 includes linking information 1202 to link ad unit id, coupon id, customer id, advertiser id, and retailer id. Report 1200 also includes an analytics component 1204 which may provide detailed analysis on a coupon's clip rate and its redemption rate. The coupon clip rate and redemption rate may be used to optimize a coupon campaign. As has been mentioned, machine running techniques are used to generate a coupon in a dynamic fashion. For example, coupon may be configured to have a certain clip rate and a certain redemption. If a clip rate for a coupon is too high the system may dynamically reduce the discount associated with the coupon in order to throttle or scale back the redemption rate. Alternatively, if the coupon clip rate is too low, then the DCPM 102 may dynamically increase the discount associated with the coupon in order to achieve the desired clip rate. Likewise, a coupons redemptions rate may be used to dynamically scale the offer sized associated with the coupon in order to achieve a desirable redemption rate.

Figure 13:
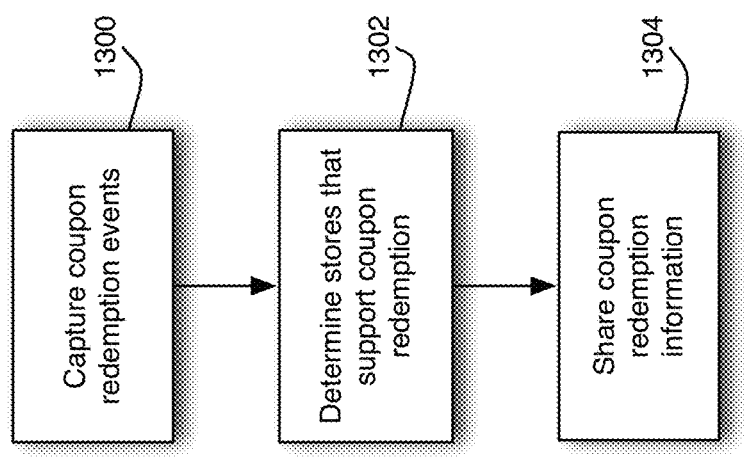
FIG. 13 shows the steps for determining store locations that are able to redeem coupons, in accordance with one embodiment of the invention.

FIG. 13 of the drawings shows a flow chart of operations performed by DCPMS 102 to generate coupon redemption information based on crowd sourcing, in accordance with one embodiment. Referring to FIG. 13, at block 1300 the DCPMS 102 captures coupon redemption events. A coupon redemption event may comprise one of a redemption notification and a redemption non-redemption notification.

In one embodiment, a coupon redemption notification may be triggered by the successful redemption of a coupon at a store location. In particular, the report redemption ( ) function 918 of the retailer coupon app may be used to send a coupon redemption notification to the DCPMS 102. FIG. 14 shows an example of a coupon redemption notification 1400, in accordance with one embodiment. The coupon redemption notification 1400 fields for a store identifier, date, item, quantity, and coupon identifier. The store identifier is used to identify the store where the coupon redemption took place. The date is the date of the coupon redemption. The quantity is the number of items purchased while redeeming the coupon and the coupon identifier is used to identify the coupon that was used for the coupon redemption. Not all fields may be required and in some embodiments some fields may not event be present. For example the quantity and item fields may be optional or not even present in some embodiments.

A coupon non-redemption notification may be generated to report that a coupon could not be redeemed at a particular store location, e.g. due to lack of inventory for items associated with coupons. An exemplary coupon non-redemption event is shown in FIG. 15. In one embodiment, the coupon app 108B supports generation of the coupon non-redemption notification. For this purpose, the coupon app 108B includes a user interface to allow the user to generate and transmit a coupon non-redemption notification to the DCPMS 102. For example, said user interface may allow the user to select a coupon that could not be redeemed at a particular store location, and to specify the particular item that the user wanted to redeem with the coupon. The item may only be required in cases where a coupon may be redeemable through the purchase of different items. In cases where, a coupon is generated specifically for a particular item, then the user will not have to specify the item to generate the coupon non-redemption notification.

In one embodiment, the store id may be automatically populated for instance where it can be determined based on determining the store location using location data for the client device. For example, when the user is in the store location for which the coupon non-redemption notification is being generated, then the coupon app 108B will use the location of the client device to perform a lookup of stores in the neighborhood of the location of the client device. If there is only one store in the neighborhood then the store id of said store is used. If there is more than one store in the neighborhood, then the matching stores are presented to the user via the user interface and the user is allowed to choose correct store location.

In some cases, the when the user is generating the coupon non-redemption notification, the user may not be in the store location at which the coupon could not be redeemed. For example, upon returning from shopping, the user may be at home when the user may wish to generate the coupon non-redemption notification. Thus, is will be apparent that for this situation the store location cannot be determined from the current location of the user's phone. For this situation, the coupon app 108B may be configured to show a list of store locations to the user, and the user is allowed to choose the correct store location from said list. Various techniques may be used to create the list of store locations. For example, the coupon app 108B may be based on a list of frequently used stores, a list of favorite stores, etc.

Figure 16:
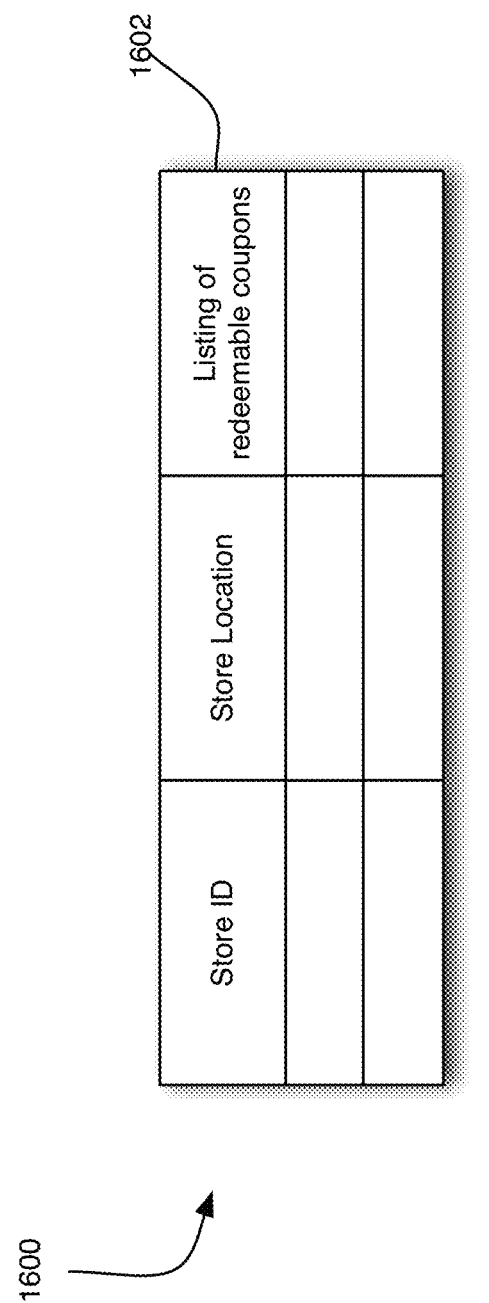
FIG. 16 shows the format tracking listings of redeemable coupons for each store, in accordance with one embodiment of the invention.
Figure 17:
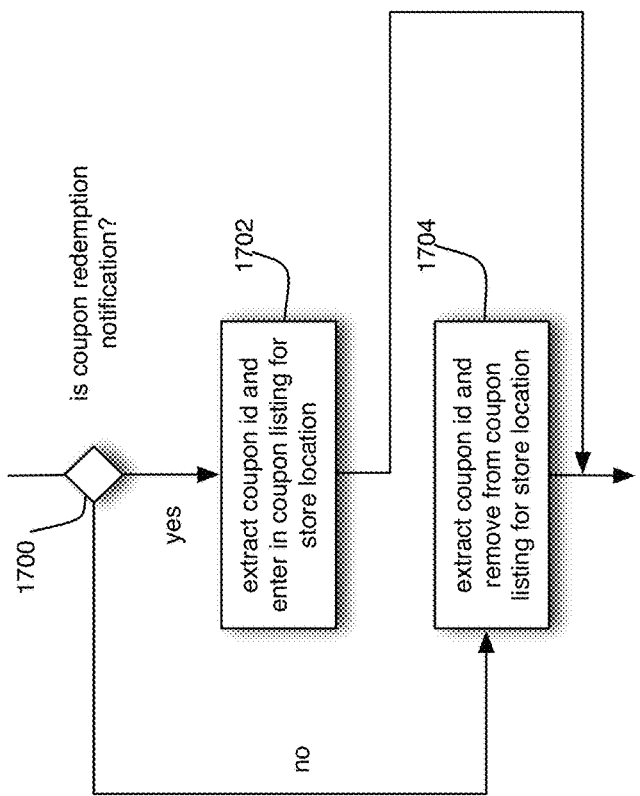
FIG. 17 illustrates the steps for processing a coupon event notification, in accordance with one embodiment of the invention.

Referring again to FIG. 13, at block 1302, the DCPMS 102 executes a process to determine the stores that support coupon redemption. For this process, the DCPMS 102 aggregates the coupon redemption events from all users and uses this information to track a listing of redeemable coupons for each store location. FIG. 16 shows a table 1600 that that includes a column 1602 comprising a listing of redeemable coupons, in accordance with one embodiment. FIG. 17 shows a process for maintaining the column 1602, in accordance with one embodiment. Referring to FIG. 17, the process is executed for each coupon event notification received. At block 1700, the DCPMS 102 determines if the coupon event notification is a coupon redemption notification. If it is then control passes to block 1702, otherwise control passes to block 1704. The processing under the block 1702, in accordance with one embodiment, includes extracting the coupon id and store id from the coupon redemption notification and adding the extracted coupon id into the column 1602 for the correct store id, if it was not there already. The processing under the block 1704 is for a coupon non-redemption notification. Under the block 1704, the coupon id and the store id from the coupon non-redemption notification are extracted. The entry under column 1602 of the table 1600 corresponding to the extracted store id is then updated to remove the extracted coupon id therefrom if it was in the listing represented by the column 1602. Thus, the listings under the column 1602 may be maintained to accurately reflect the coupons that are currently redeemable at each store location.

Referring again to FIG. 13, at block 1304, the DCPMS 102 shares coupon redemption information with each user, said information including the particular store locations in a neighborhood of each user that are available locations for coupon redemption. The information is shared by over-the-air data transmission to each client device. The information is in a format to support rendering on a map.

Figure 18:
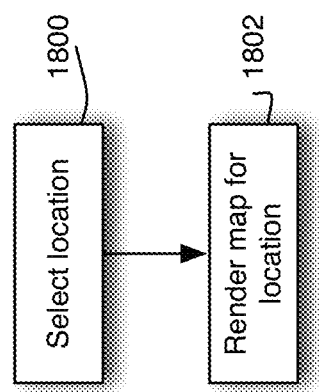
FIG. 18 shows a process for rendering a map showing store locations at which coupons may be redeemed, in accordance with one embodiment of the invention.

Referring now to FIG. 18 of the drawings, there is shown a flow chart of user steps performed in conjunction with the coupon app 108B, in accordance with one embodiment in order to display a map of store locations supporting coupon redemption. Referring to FIG. 18, at block 188, the user selects a location or neighborhood. This may be achieved by obtaining location data from a GPS sensor associated with the client device. Based on the location data, the coupon app 108B renders a map (at block 1802) which is synced to DCPMS 102 showing the locations of current stores in the vicinity of the location of the client device that have ability to redeem coupons that have been clipped by a client using the coupon app 108B. Thus, each consumer/user receives information on the stores that are currently able to redeem the coupons they have clipped, but have not yet redeemed. For generating this information, the DCPMS 102 may be configured to keep a list L of the coupons clipped by each consumer and which have not been redeemed. The list L may be used to filter the table 1600 for each user to select the stores that are currently redeeming coupons in the list L for the user. The filtered table 1600 for each user is what the DCPMS 102 may be configured to send to each client device, in accordance with one embodiment.

In one embodiment, the DCPMS 102 may be configured to utilize data from various sources in order to build a map of store locations that are able to redeem coupons. In accordance, in one embodiment these data sources may include store POS data, distributor information, and crowd sourcing information.

Figure 19:
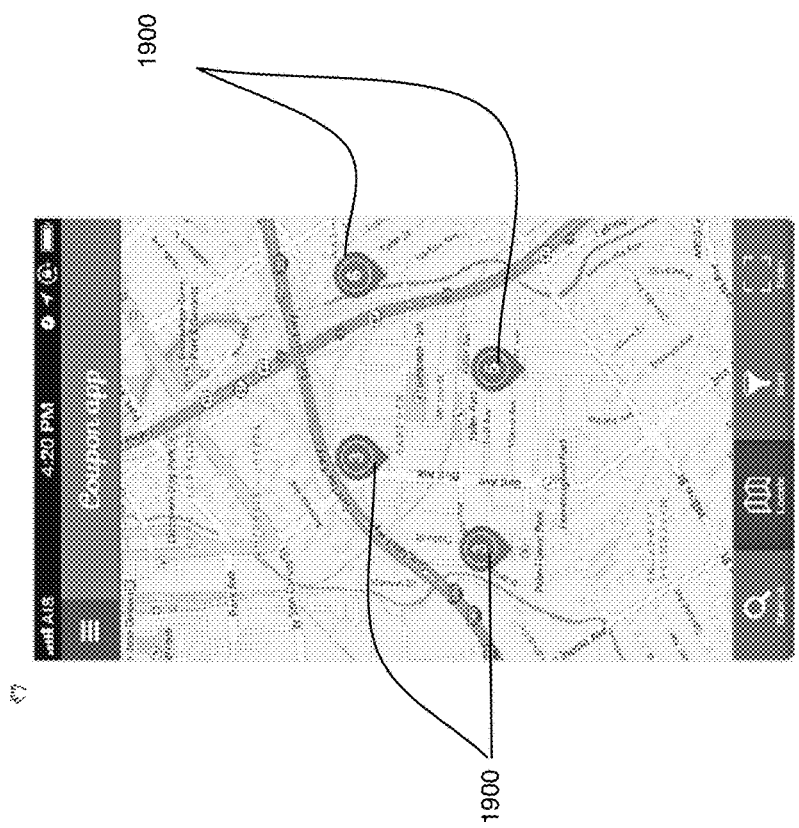
FIGS. 19-20 show examples of maps showing store locations at which coupons may be redeemed, in accordance with one embodiment of the invention.
Figure 20:
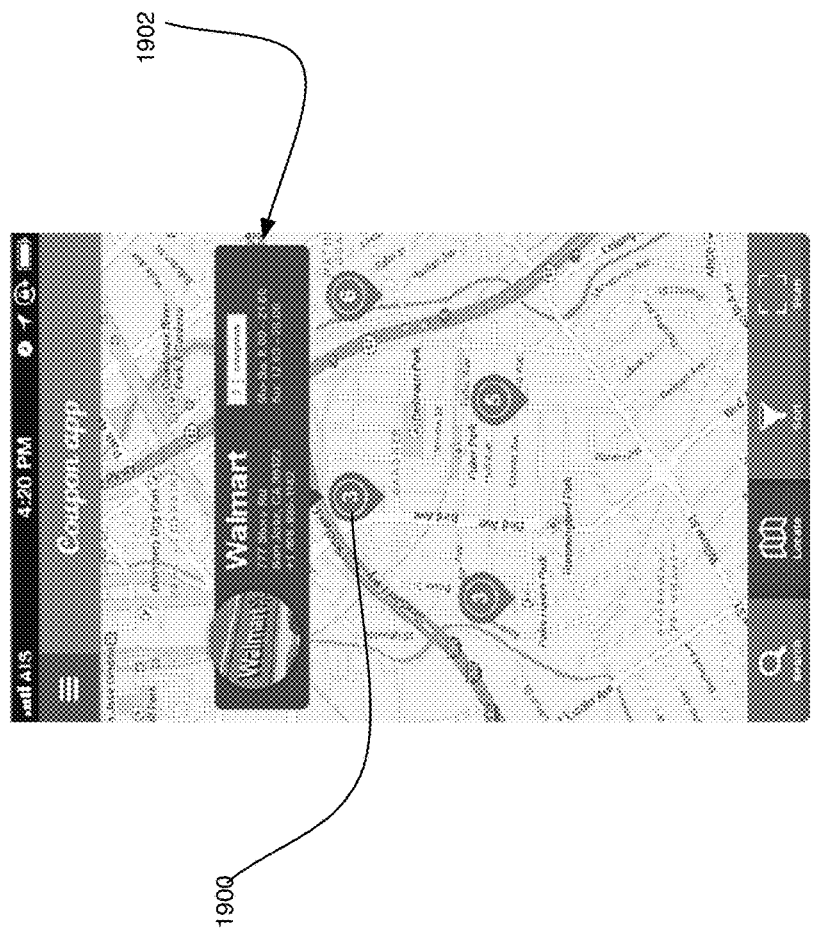

FIGS. 19 and 20 provide examples of screenshots of maps that may be rendered by the coupon app 108B in order to direct a consumer to store locations that are able to support coupon redemption. Referring the FIG. 19, reference numeral 1900 indicates icons, each indicating an associated store location on a map. The associated store location is one which is currently redeeming coupons that have been clipped by the user in accordance with techniques disclosed herein. Each icon may bear a number indicating the number of coupons that the user has clipped and which are redeemable at the associated store location. FIG. 20 shows the same map of FIG. 19, but in the case of the FIG. 20, the user has selected (touched) one of the icons 1900 responsive to which the user interface has changed to reveal an area 1902 that provides more information of the store location associated with the icon that was selected.

Figure 21:
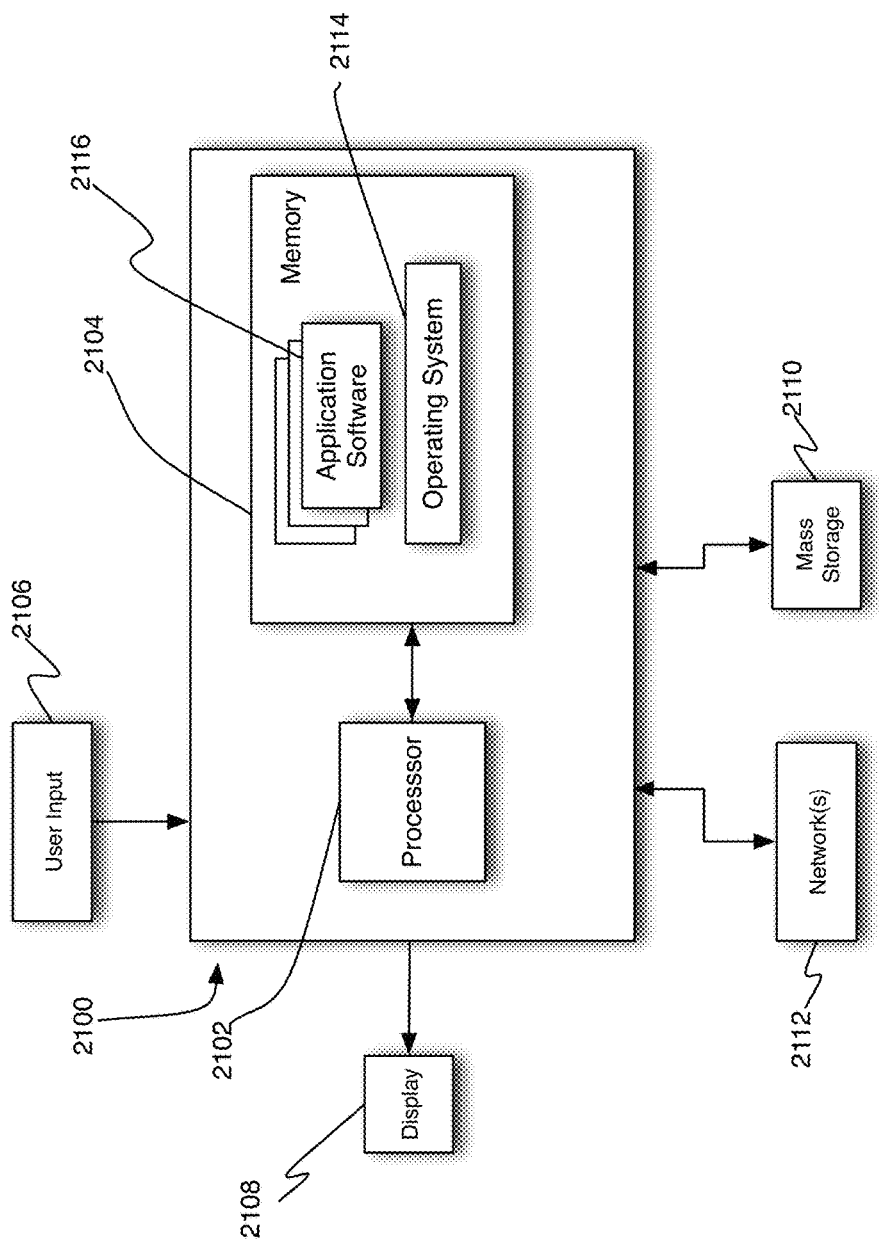
FIG. 21 shows a high-level block diagram of hardware for implementing the DCPMS, in accordance with one embodiment of the invention.

FIG. 21 shows an example of hardware 2100 that may be used to implement the DCPMS 102 in accordance with one embodiment. The hardware 2100 may include at least one processor 2102 coupled to a memory 2104. The processor 2102 may represent one or more processors (e.g., microprocessors), and the memory 1304 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 2104 may be considered to include memory storage physically located elsewhere in the hardware, e.g. any cache memory in the processor 2102, as well as any storage capacity used as a virtual memory, e.g., as stored on a mass storage device.

The hardware also typically receives a number of inputs and outputs for communicating information externally. For interface with a user or operator, the hardware may include one or more user input output devices 1306 (e.g., a keyboard, mouse, etc.) and a display 2108. For additional storage, the hardware 2100 may also include one or more mass storage devices 2110, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 2112 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 2102 and each of the components, as is well known in the art.

The hardware 2100 operates under the control of an operating system 2114, and executes application software 2116 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The invention claimed is:

1. A method for updating consumers, comprising:
in a computing device:
tracking coupon redemption activity across a plurality of store locations comprising enabling consumers to generate coupon non-redemption notifications for transmission across a network to a coupon personalization and management system; wherein each coupon non-redemption notification comprises information identifying a coupon and a store at which said coupon could not be redeemed and, wherein the non-redemption notification is generated due to lack of availability of inventory items associated with the coupon;
maintaining a coupon redemption store list comprising stores that are currently able to redeem coupon based on the coupon redemption activity; and
updating a plurality of client devices with at least a subset of information from the coupon redemption store list to enable the consumers to identify the stores at which coupons are redeemable.

2. The method of claim 1, said tracking comprises enabling retailers to generate coupon redemption notifications for transmission across the network to a coupon personalization and management system; wherein each coupon redemption notification comprises information identifying a coupon and a store at which said coupon was successfully redeemed.

3. The method of claim 2, wherein maintaining the coupon redemption store list comprises, for each coupon redemption notification received for a particular store, updating a list of coupons redeemable at said store to include the coupon identified in the coupon redemption notification.

4. The method of claim 3, wherein maintaining the coupon redemption store list comprises, for each coupon non-redemption notification received for a particular store, updating a list of coupons redeemable at said store to exclude the coupon identified in the coupon non-redemption notification.

5. The method of claim 2, enabling consumers to generate coupon non-redemption notifications comprises provisioning a coupon application on a client device of a consumer, the coupon application providing a function to select a coupon and to report a non-redemption event in connection with said coupon at a particular store location to the coupon personalization and management system.

6. The method of claim 5, wherein the store location is detected automatically based on a location of the client device.

7. The method of claim 6, wherein, if multiple store locations are indicated based on the location of the client device then prompting the consumer to select the store location from a list of choices.

8. The method of claim 5, wherein, if the store location cannot be determined based on the location of the client device then accessing a list of historical shopping locations for the consumer to suggest choices for the store locations; presenting the choices to the consumer; and setting the store location based on input from the consumer.

9. The method of claim 1, further comprising keeping a clipped coupons list defining a list of coupons for each consumer to track coupons that said consumer has clipped, but has not yet redeemed.

10. The method of claim 9, further comprising, for each consumer, filtering the coupon redemption store list by the clipped coupons list for said consumer to generate a filtered list representing the stores that can redeem coupons from the clipped coupons list for that consumer; and transmitting the filtered list to the consumer periodically.

11. The method of claim 10, further comprising enabling the consumer to view the stores on the filtered list on a map rendered on a client device for said consumer.

12. The method of claim 11, wherein said map includes at least one graphical icon to indicate an associated store at which at least one coupon from the clipped coupons list for the consumer is currently redeemable.

13. The method of claim 12, wherein the at least one graphical icon comprise a number corresponding to number of coupons from the clipped coupons list for the consumer that are currently redeemable at the associated store.

* * * * *